US012750195B2

(12) United States Patent
Abotabl et al.

(10) Patent No.: US 12,750,195 B2
(45) **Date of Patent: *Sep. 29, 2026**

(54) BANDWIDTH PART-SPECIFIC DOWNLINK-UPLINK PATTERNS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 283 days.

This patent is subject to a terminal disclaimer.

(21) Appl. No.: 18/582,893

(22) Filed: Feb. 21, 2024

(65) Prior Publication Data

US 2024/0275564 A1 Aug. 15, 2024

Related U.S. Application Data

(63) Continuation of application No. 17/446,570, filed on Aug. 31, 2021, now Pat. No. 11,929,959.

(51) Int. Cl.
*H04L 5/00* (2006.01)
*H04L 5/14* (2006.01)
(Continued)

(52) U.S. Cl.
CPC .............. *H04L 5/0082* (2013.01); *H04L 5/14* (2013.01); *H04W 72/044* (2013.01); *H04W 72/23* (2023.01)

(58) Field of Classification Search
CPC ....... H04L 5/0082; H04L 5/14; H04L 5/0094; H04W 72/044; H04W 72/23;
(Continued)

(56) References Cited

U.S. PATENT DOCUMENTS

| | | | | |
|---|---|---|---|---|
| 11,929,959 B2 * | 3/2024 | Abotabl | ................ | H04W 72/23 |
| 2019/0149380 A1 * | 5/2019 | Babaei | .................. | H04W 72/23 370/330 |

(Continued)

FOREIGN PATENT DOCUMENTS

| | | |
|---|---|---|
| WO | WO-2019030925 A1 | 2/2019 |
| WO | WO-2019135287 A1 | 7/2019 |

(Continued)

OTHER PUBLICATIONS

3GPP TS 38.213: "3rd Generation Partnership Project, Technical Specification Group Radio Access Network, NR, Physical Layer Procedures for Control (Release 16)", 3rd Generation Partnership Project, Mobile Competence Centre, 650, Route Des Lucioles, F-06921 Sophia-Antipolis Cedex, France, vol. RAN WG1. No. V16.1.0, Apr. 3, 2020, XP051893821, pp. 1-156, p. 17, line 3—p. 18, line 8, paragraph [0010], Section 9, clauses 6, 9.2.1, 10.2 and 12, chapter 11.1 on p. 114-116.

(Continued)

*Primary Examiner* — Afshawn M Towfighi
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a base station, a configuration of a plurality of bandwidth parts (BWPs) in a frequency band, wherein the configuration identifies a respective BWP-specific downlink (DL)-uplink (UL) pattern for each BWP of the plurality of BWPs, and wherein at least two of BWPs
(Continued)

of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The UE may communicate with the base station in one or more active BWPs of the plurality of BWPs using the respective BWP-specific DL-UL pattern for each of the one or more active BWPs. Numerous other aspects are described.

19 Claims, 8 Drawing Sheets

(51) Int. Cl.
*H04W 72/044* (2023.01)
*H04W 72/23* (2023.01)

(58) Field of Classification Search
CPC ........... H04W 72/541; H04W 72/0453; H04W 72/0457; H04W 72/232
See application file for complete search history.

(56) References Cited

U.S. PATENT DOCUMENTS

| | | | | |
|---|---|---|---|---|
| 2020/0275417 | A1* | 8/2020 | Takeda | H04L 5/0007 |
| 2020/0275452 | A1* | 8/2020 | Shen | H04W 72/0446 |
| 2020/0280474 | A1 | 9/2020 | Babaei et al. | |
| 2021/0227551 | A1* | 7/2021 | Ly | H04L 5/0007 |
| 2022/0295560 | A1 | 9/2022 | Shokri Razaghi et al. | |
| 2023/0064334 | A1 | 3/2023 | Abotabl et al. | |
| 2024/0015705 | A1* | 1/2024 | You | H04W 72/0446 |
| 2024/0275564 | A1* | 8/2024 | Abotabl | H04W 72/23 |
| 2025/0007642 | A1 | 1/2025 | You et al. | |

FOREIGN PATENT DOCUMENTS

| | | |
|---|---|---|
| WO | WO-2020066232 A1 | 4/2020 |
| WO | 2021133678 | 7/2021 |

OTHER PUBLICATIONS

International Search Report and Written Opinion—PCT/US2022/074344—ISA/EPO—Feb. 27, 2023.
Partial International Search Report—PCT/US2022/074344—ISA/EPO—Dec. 22, 2022.

* cited by examiner

BANDWIDTH PART-SPECIFIC DOWNLINK-UPLINK PATTERNS

RELATED APPLICATION

This application is a continuation of U.S. patent application Ser. No. 17/446,570, filed Aug. 31, 2021, entitled "BANDWIDTH PART-SPECIFIC DOWNLINK-UPLINK PATTERNS," which is incorporated herein by reference in its entirety.

FIELD OF THE DISCLOSURE

Aspects of the present disclosure generally relate to wireless communication and to techniques and apparatuses for bandwidth part (BWP)-specific downlink (DL)-uplink (UL) patterns.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive, from a base station, a configuration of a plurality of bandwidth parts (BWPs) in a frequency band, wherein the configuration identifies a respective BWP-specific downlink (DL)-uplink (UL) pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The one or more processors may be configured to communicate with the base station in one or more active BWPs of the plurality of BWPs using the respective BWP-specific DL-UL pattern for each of the one or more active BWPs.

Some aspects described herein relate to a base station for wireless communication. The base station may include a memory and one or more processors coupled to the memory. The one or more processors may be configured to transmit, to a UE, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The one or more processors may be configured to communicate with the UE in one or more active BWPs of the plurality of BWPs using the respective BWP-specific DL-UL pattern for each of the one or more active BWPs.

Some aspects described herein relate to a method of wireless communication performed by a UE. The method may include receiving, from a base station, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The method may include communicating with the base station in one or more active BWPs of the plurality of BWPs using the respective BWP-specific DL-UL pattern for each of the one or more active BWPs.

Some aspects described herein relate to a method of wireless communication performed by a base station. The method may include transmitting, to a UE, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The method may include communicating with the UE in one or more active BWPs of the plurality of BWPs using the respective BWP-specific DL-UL pattern for each of the one or more active BWPs.

Some aspects described herein relate to a non-transitory computer-readable medium that stores a set of instructions for wireless communication by a UE. The set of instructions, when executed by one or more processors of the UE, may cause the UE to receive, from a base station, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The set of instructions, when executed by one or more processors of the UE, may cause the UE to communicate with the base station in one or more active BWPs of the plurality of BWPs using the respective BWP-specific DL-UL pattern for each of the one or more active BWPs.

Some aspects described herein relate to a non-transitory computer-readable medium that stores a set of instructions for wireless communication by a base station. The set of instructions, when executed by one or more processors of the base station, may cause the base station to transmit, to a UE, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The set of instructions, when executed by one or more processors of the base station, may cause the base station to communicate with the UE in one or more active BWPs of the plurality of BWPs using the respective BWP-specific DL-UL pattern for each of the one or more active BWPs.

Some aspects described herein relate to an apparatus for wireless communication. The apparatus may include means for receiving, from a base station, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The apparatus may include means for communicating with the base station in one or more active BWPs of the plurality of BWPs using the respective BWP-specific DL-UL pattern for each of the one or more active BWPs.

Some aspects described herein relate to an apparatus for wireless communication. The apparatus may include means for transmitting, to a UE, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The apparatus may include means for communicating with the UE in one or more active BWPs of the plurality of BWPs using the respective BWP-specific DL-UL pattern for each of the one or more active BWPs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
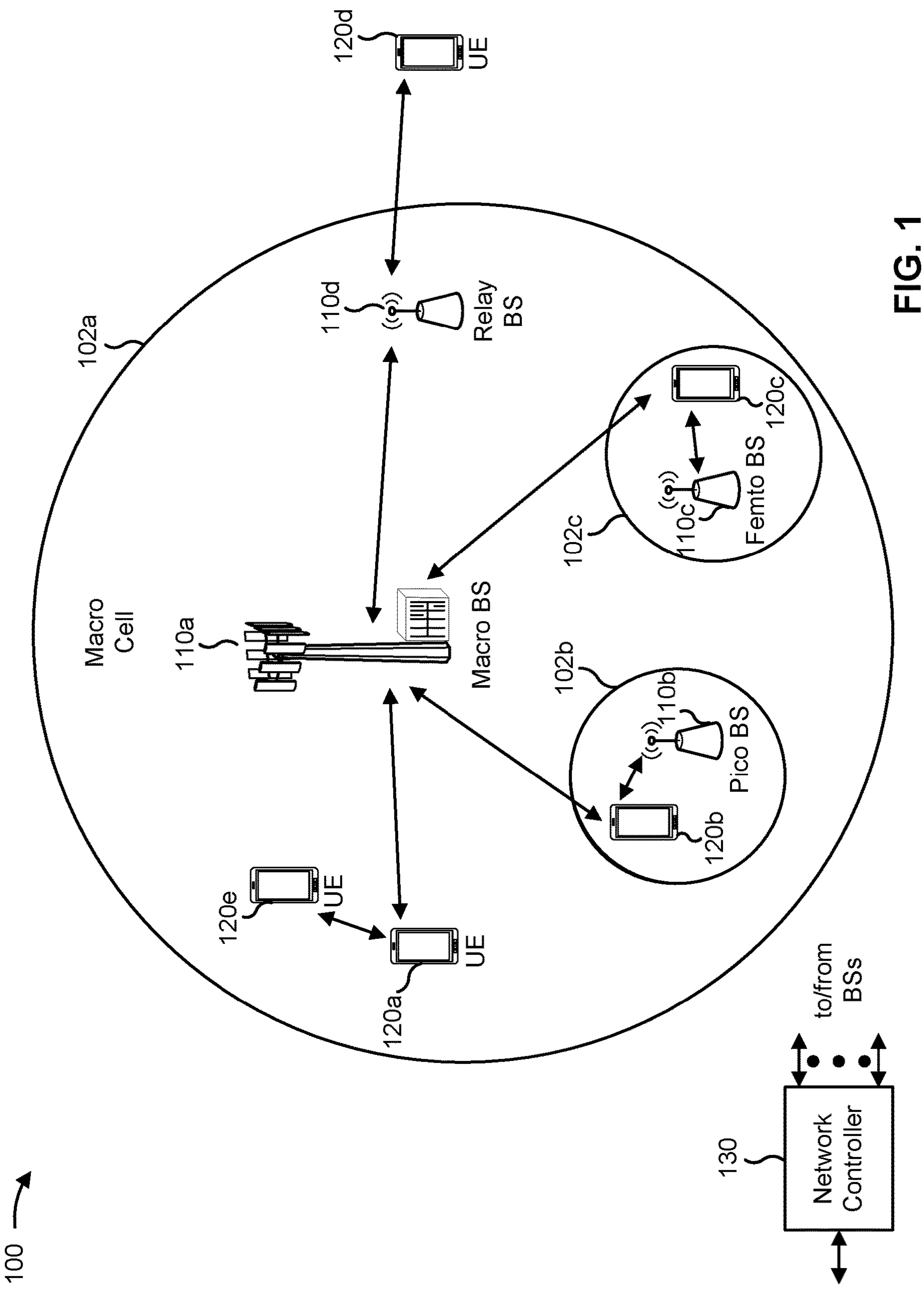
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1. FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, a configuration of a plurality of bandwidth parts (BWPs) in a frequency band, wherein the configuration identifies a respective BWP-specific downlink (DL)-uplink (UL) pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink; and communicate with the base station in one or more active BWPs of the plurality of BWPs using the respective BWP-specific DL-UL pattern for each of the one or more active BWPs. Additionally, or alternatively, the communication manager 140 may perform one or more other operations described herein.

In some aspects, the base station 110 may include a communication manager 150. As described in more detail elsewhere herein, the communication manager 150 may transmit, to a UE, a configuration of a plurality of BWPs in a frequency band, wherein the configuration identifies a respective BWP-specific DL-UL pattern for each BWP of the plurality of BWPs. and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink; and communicate with the UE in one or more active BWPs of the plurality of BWPs using the respective BWP-specific DL-UL pattern for each of the one or more active BWPs. Additionally, or alternatively, the communication manager 150 may perform one or more other operations described herein.

As indicated above, FIG. 1 is provided as an example. Other examples may differ from what is described with regard to FIG. 1.

Figure 2:
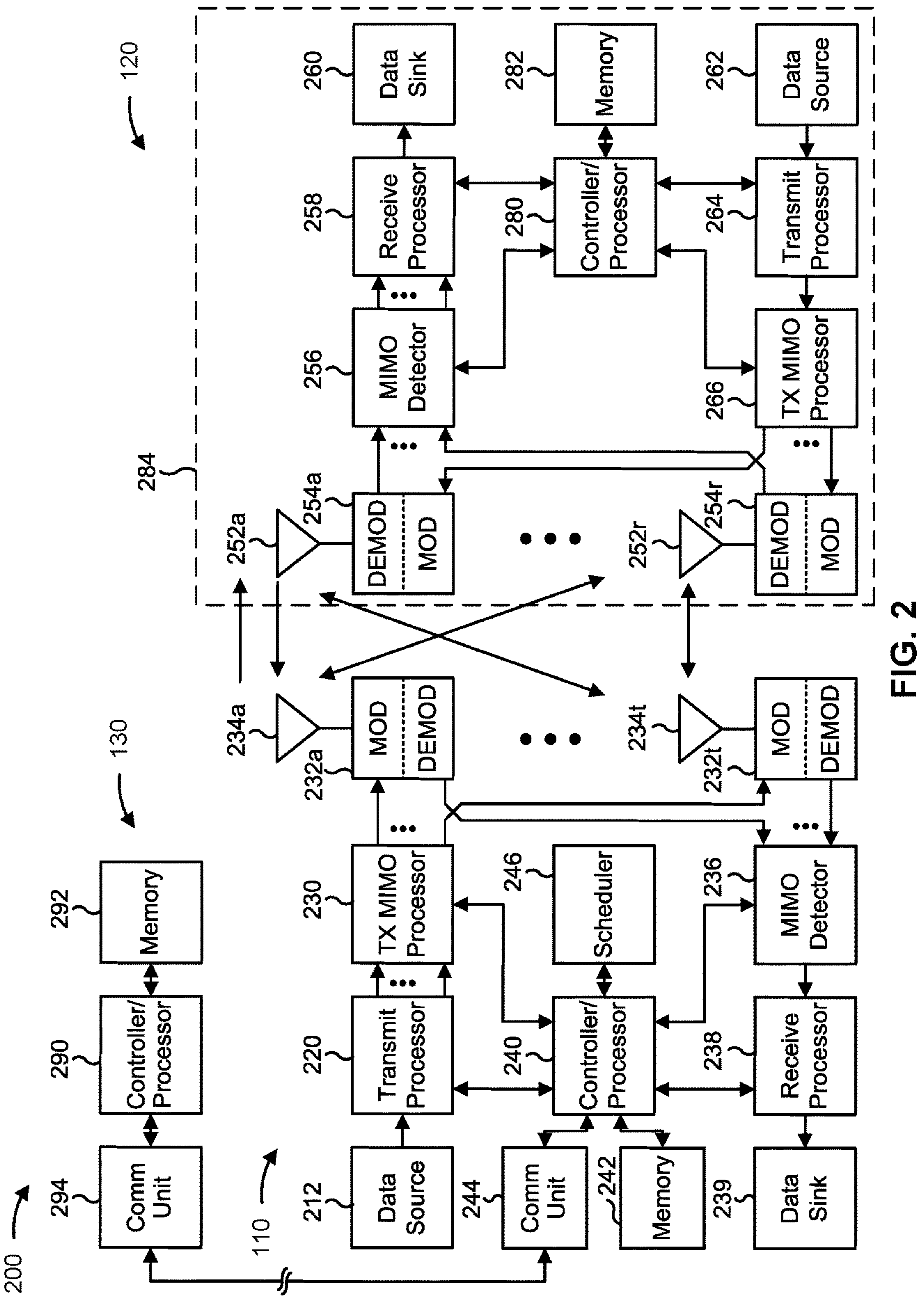
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP. RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with BWP-specific DL-UL patterns, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for receiving, from a base station, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink (e.g., using antenna 252, modem 254, MIMO detector 256, receive processor 258, controller/processor 280, memory 282, or the like); and/or means for communicating with the base station in one or more active BWPs of the plurality of BWPs using the respective BWP-specific DL-UL pattern for each of the one or more active BWPs (e.g., using antenna 252, modem 254, MIMO detector 256, receive processor 258, controller/processor 280, transmit processor 264, TX MIMO processor 266, memory 282, or the like). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink (e.g., using controller/processor 240, transmit processor 220, TX MIMO processor 230, modem 232, antenna 234, memory 242, or the like); and/or means for communicating with the UE in one or more active BWPs of the plurality of BWPs using the respective BWP-specific DL-UL pattern for each of the one or more active BWPs (e.g., using controller/processor 240, transmit processor 220, TX MIMO processor 230, modem 232, antenna 234, MIMO detector 236, receive processor 238, memory 242, or the like). The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
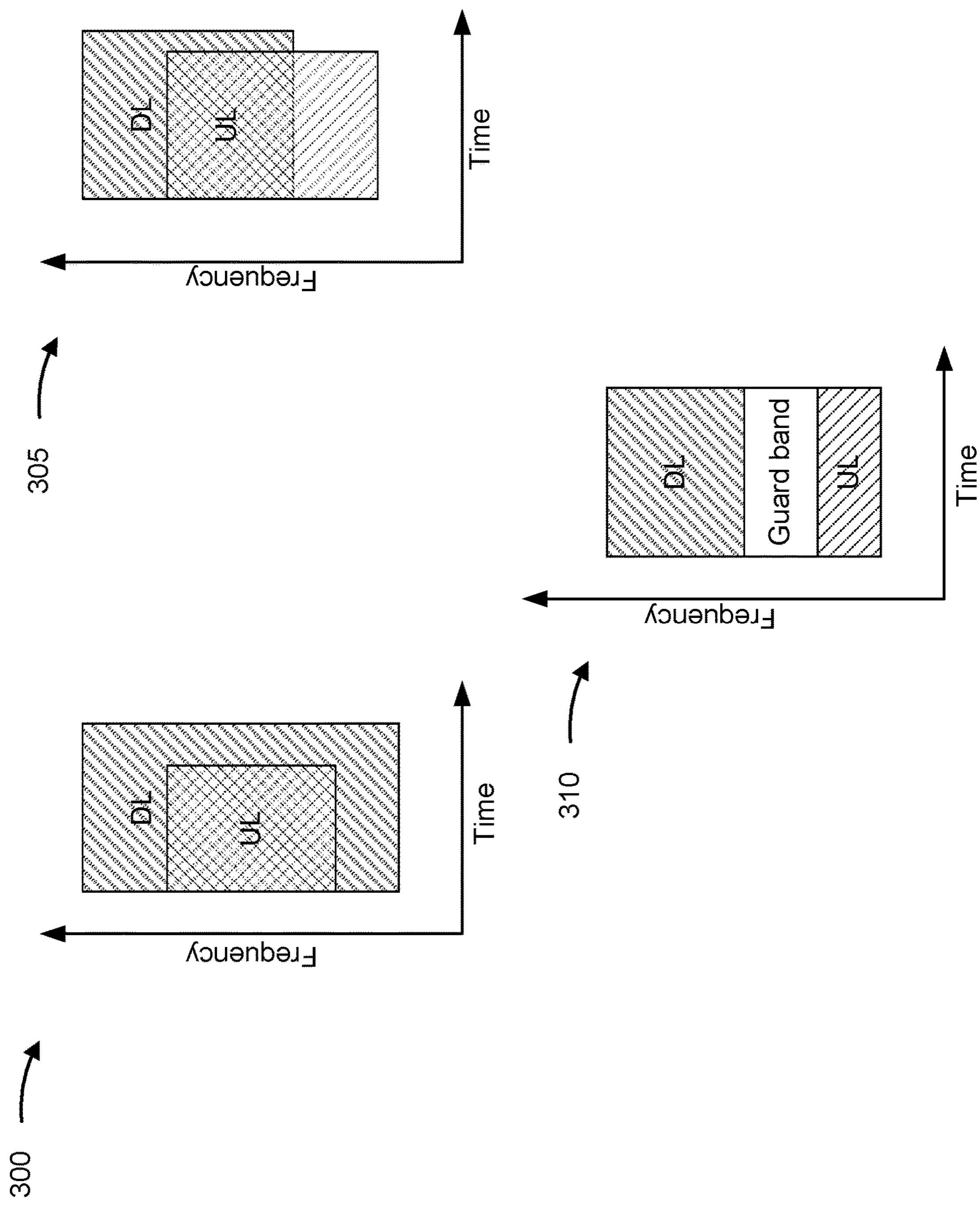
FIG. 3 is a diagram illustrating examples of full-duplex communication in a wireless network, in accordance with the present disclosure.

FIG. 3 is a diagram illustrating examples 300, 305, and 310 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit uplink communications and receive downlink communications at the same time (e.g., in the same slot). "Half-duplex communication" in a wireless network refers to unidirectional communications (e.g., downlink or uplink communication) between devices at a given time (e.g., in a given slot). While presently, in NR, frequency bands are often referred to as a frequency division duplex (FDD) band or a time division duplex (TDD) band based on definitions in wireless standards, this distinction may be less useful in a full-duplex communication context where, within a given band (whether presently defined in NR as an FDD band or a TDD band), both uplink (UL) and downlink (DL) communications may be performed simultaneously within various sub-bands within the band.

As shown in FIG. 3, examples 300 and 305 show examples of in-band full-duplex (IBFD) communication. In IBFD, a UE may transmit uplink communications to a base station and receive downlink communications from the base station on the same time and frequency resources. As shown in example 300, in IBFD, the time and frequency resources for uplink communication may fully overlap with the time and frequency resources for downlink communication. Hence, as illustrated in example 300, in the box labeled UL, both uplink and downlink communications may be performed simultaneously. As shown in example 305, in IBFD, the time and frequency resources for uplink communication may partially overlap with the time and frequency resources for downlink communication.

As further shown in FIG. 3, example 310 shows an example of sub-band full-duplex (SBFD) communication, which may also be referred to as “flexible duplex.” In SBFD, a UE may transmit uplink communications to a base station and receive downlink communications from the base station at the same time, but on different frequency resources (within the same band). For example, the different frequency resources may be sub-bands of a frequency band such as a time division duplexing (TDD) band (i.e., a frequency band currently defined in NR as a TDD band) or a frequency division duplexing (FDD) band (i.e., a frequency band currently defined in NR as a TDD band). In this case, the downlink resource may be separated from the uplink resource, in the frequency domain, by a guard band.

As indicated above, FIG. 3 is provided as an example. Other examples may differ from what is described with respect to FIG. 3.

In some examples, multiple BWPs may be configured for a UE in a frequency band or a component carrier (CC). For example, a UE may be configured with multiple downlink BWPs (e.g., up to four) and/or multiple uplink BWPs (e.g., up to four). In this case, one BWP may be activated at a time. For example, a configured downlink BWP may be activated for downlink communications, and a configured uplink BWP may be activated for uplink communications. In some examples, a downlink (DL)-uplink (DL) pattern may also be configured for the UE. A DL-UL pattern is, for example, a pattern of slot formats (e.g., downlink slot, uplink slot, or flexible slot) for a number of slots, however, an DL-UL pattern may be defined over any time interval (symbol, transmission time interval (TTI), sub-slot, slot, etc.). The DL-UL pattern may be applied to all configured BWPs in a frequency band or a CC. For example, an active downlink BWP may be used for a downlink slot and an active uplink BWP may be used for an uplink slot. In some examples, in order to enable full-duplex operation, one or more slots may be configured to be full-duplex slots, in which a configured allocation of frequency resources for full-duplex communication is used for full-duplex communications. Full-duplex communications may provide a benefit of increased bandwidth for communications between a base station and UE by allowing the base station and the UE to transmit and receive in the same set of resources. However, the use of the configured full-duplex slots and the configured allocation of frequency resources for all instances of full-duplex communication may be inflexible, and may not be optimal for scheduling full-duplex downlink and communications.

Some techniques and apparatuses described herein enable BWP-specific DL-UL patterns to be configured for a UE. In some aspects, the UE may receive, from a base station, a configuration of a plurality of BWPs in a frequency band, and the configuration may identify a respective BWP-specific DL-UL pattern for each BWP of the plurality of BWPs. The UE and the base station may communicate in one or more active BWPs using the respective BWP-specific DL-UL patterns for each of the one or more active BWPs. In some aspects, multiple BWPs may be activated at the same time and used together to enable full-duplex operation in one or more slots, and different combinations of BWPs may be activated or deactivated to achieve different configurations for full-duplex operation with low signaling overhead. As a result, the flexibility of allocating resources for full-duplex communications may be increased, which may result in increased network speed and decreased traffic latency for full-duplex communications.

Figure 4:
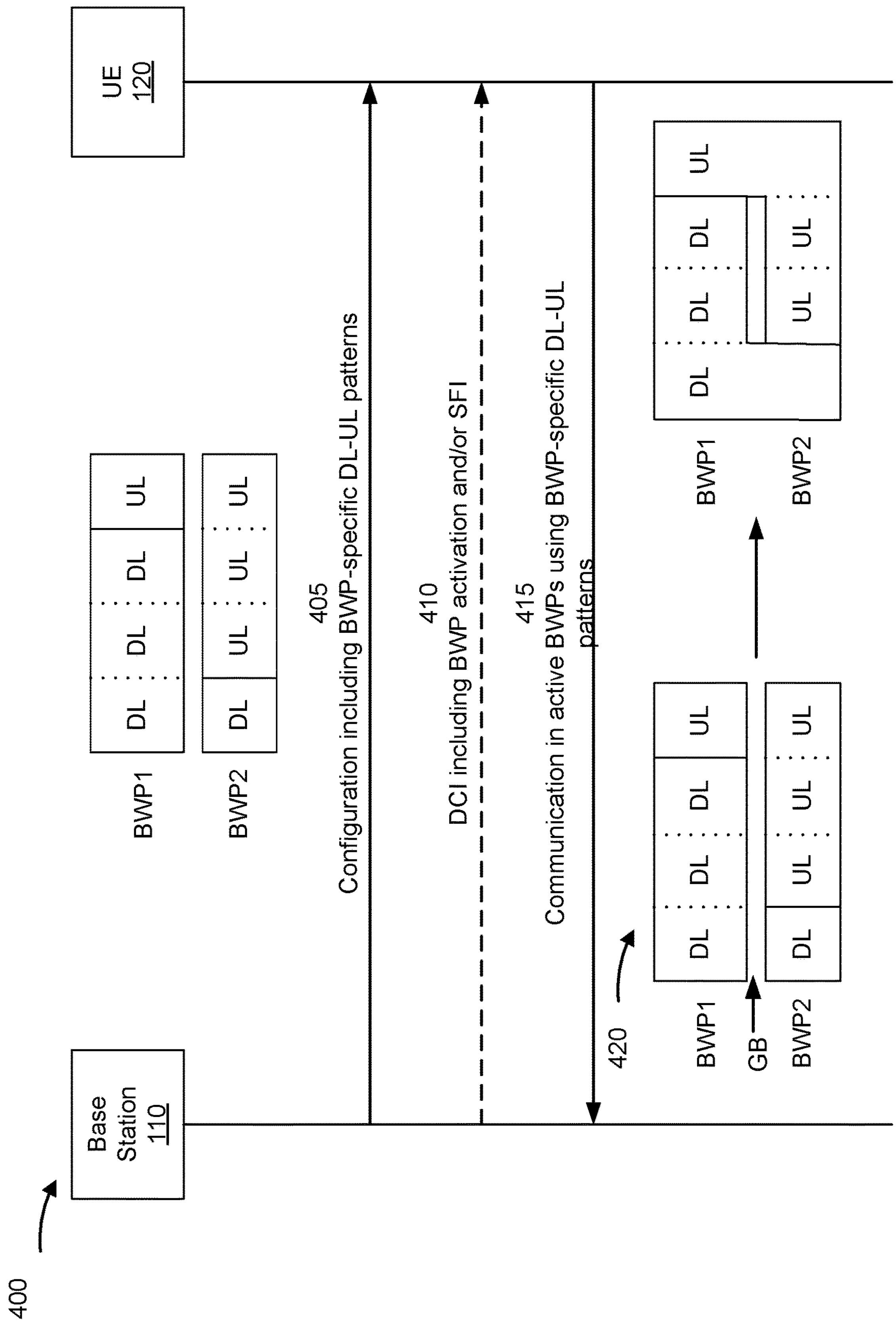
FIG. 4 is a diagram illustrating an example associated with bandwidth part (BWP)-specific time downlink (DL)-uplink (UL) patterns, in accordance with the present disclosure.

FIG. 4 is a DL-UL patterns, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 4, and by reference number 405, the base station 110 may transmit, to the UE 120, a configuration of a plurality of BWPs in a frequency band or CC. A BWP is a configured contiguous set of frequency resources of a carrier, for communication by a UE, that can be activated or deactivated by signaling such as a DCI message. For example, the base station 110 may transmit the configuration to the UE 120 in a radio resource control (RRC) message. The UE 120 may receive the configuration from the base station 110. The configuration may identify a respective BWP-specific DL-UL pattern for each BWP in the plurality of BWPs. In some aspects, at least two of the BWPs in the same frequency band or CC may be configured with different BWP-specific DL-UL patterns. In some aspects, at least two of the BWPs configured with respective BWP-specific DL-UL patterns may fully or partially overlap. In some aspects, at least two of the BWPs configured with respective BWP-specific DL-UL patterns may be adjacent. In some aspects, at least two of the BWPs configured with respective BWP-specific DL-UL patterns may be separated by a guard band.

The BWP-specific DL-UL pattern for a BWP is a pattern of time-interval formats for a plurality of time intervals (e.g., symbols, transmission time interval (TTI), sub-slots, slots, etc.) For ease of explanation, the examples described below will be discussed with reference to a time interval being equal to a slot. For a given slot in the BWP-specific DL-UL pattern, the slot format may be downlink (e.g., a downlink slot), uplink (e.g., an uplink slot), or flexible (e.g., a flexible slot). A flexible slot is a slot that may be used as a downlink slot or an uplink slot (e.g., based at least in part on a slot format indicator (SFI) transmitted from the base station 110 to the UE 120). As shown in FIG. 4, the configuration may identify a first DL-UL pattern for a first BWP (BWP1) and a second DL-UL pattern for a second BWP (BWP2). For example, as shown in FIG. 4, the first DL-UL pattern (for BWP1) may be DDDU (e.g., 3 downlink slots followed by 1 uplink slot), and the second DL-UL pattern (for BWP2) may be DUUU (e.g., 1 downlink slot followed by 3 uplink slots). As illustrated, the first DL-UL pattern is different from the second DL-UL pattern since slots 2 and 3 are illustrated as different. More generally, however, a first DL-UL pattern is considered to be different from a second DL-UL pattern so long as there is at least one slot in which the first pattern specifies a different slot format than the second pattern. In some aspects, one or more of the BWP-specific DL-UL patterns may also include one or more flexible slots.

In some aspects, the configuration may include a common slot format indication to be applied to all of the BWPs and a respective dedicated slot format indication for each of the BWPs. For example, the common slot format indication may indicate a slot format for one or more slots in each BWP-specific DL-UL pattern that are the same for all of the BWP-specific DL-UL patterns (e.g., for all of the BWPs). In some aspects, the common slot format indication may indicate that each BWP-specific DL-UL pattern begins with one or more downlink slots and ends with one or more uplink slots. The respective dedicated slot format indication for a BWP may indicate the slot formats (e.g., downlink, uplink, or flexible) for the remaining slots in the BWP-specific DL-UL pattern that are not configured by the common slot format indication.

In some aspects, the configuration may configure one or more of the BWPs to be active BWPs. In some aspects, the configuration may configure multiple BWPs to be active BWPs at the same time. In some aspects, by indicating multiple active BWPs in the configuration (or in a downlink control information (DCI)-based dynamic indication), the base station 110 may enable/activate full-duplex operation in one or more slots and/or half-duplex operation in one or more slots based at least in part on the respective BWP-specific DL-UL patterns of the multiple active BWPs. For example, the active BWPs may include a first active BWP configured with a first BWP-specific DL-UL pattern and a second active BWP configured with a second BWP-specific DL-UL pattern. In this case, the UE 120 and the base station 110 may operate in a half-duplex (HD) mode in slots having the same slot format in the first BWP-specific DL-UL pattern and the second BWP-specific DL-UL pattern, and the UE 120 and the base station 110 may operate in a full-duplex (FD) mode in slots having different slot formats in the first BWP-specific DL-UL pattern and the second BWP-specific DL-UL pattern. In some aspects, in slots in which the UE 120 and the base station 110 operate in the full-duplex mode, overlapping active BWPs may be used to enable IBFD communications (e.g., an IBFD mode). In some aspects, in slots in which the UE 120 and the base station 110 operate in the full-duplex mode, adjacent BWPs or BWPs separated by a guard band may be used to enable SBFD communications (e.g., an SBFD mode).

In some aspects, the plurality of BWPs configured with respective BWP-specific DL-UL patterns may be a plurality of "flexible" BWPs, and the configuration may also identify one or more configured downlink BWPs and/or one or more configured uplink BWPs. In this case, the flexible BWPs are BWPs that can be used for downlink and/or uplink communications based at least in part on the respective BWP-specific DL-UL patterns.

As further shown in FIG. 4, and by reference number 410, the base station 110 may transmit, to the UE 120, DCI that includes a BWP activation and/or an SFI. The UE 120 may receive and decode the DCI transmitted from the base station 110.

In some aspects, the DCI may include an indication of one or more of the configured BWPs with respective BWP-specific DL-UL patterns to be activated as the active BWPs. For example, the DCI may include a dynamic indication to activate one or more BWPs, deactivate one or more BWPs, and/or switch one or more active BWPs from one or more current active BWPs to the one or more indicated active BWPs. In some aspects, the DCI may include a dynamic indication of multiple BWPs to be activated. In this case, the multiple active BWPs may be used to enable/activate full-duplex operation in one or more slots and/or half-duplex operation in one or more slots based at least in part on the respective BWP-specific DL-UL patterns of the multiple active BWPs.

In some aspects, the DCI may include an SFI. The SFI may indicate, for at least one BWP with a BWP-specific DL-UL pattern that includes one or more flexible slots, an uplink or downlink slot format for the one or more flexible slots. In some aspects, the DCI including the SFI may be DCI format 2_0 (DCI 2_0) as defined or otherwise fixed by a wireless communication specification, such as one published by the 3GPP. In some aspects, the DCI may further include an indication of which BWP, of the configured BWPs, the UE 120 is to apply the SFI to. In some aspects, the DCI (e.g., DCI 2_0) may include a bit field for indicating the BWP to which the SFI is to be applied. For example, in a case in which the UE 120 is configured with 4 BWPs, the DCI may include 2 bits in the DCI field to indicate the BWP to which the SFI is to be applied. In some aspects, the DCI may be a group common DCI, and a location of the SFI in a bit field of the DCI may indicate at least one BWP to which the SFI is to be applied. For example, the UE 120 may be configured (e.g., in an RRC configuration received from the base station 110) with a set of locations in the bit field of the DCI (e.g., DCI 2_0), and each location in the bit field of the DCI that is configured for the UE 120 may be associated with a respective BWP configured for the UE 120. In this case, the UE 120 may decode the DCI (e.g., DCI 2_0) and scan for SFIs in the locations in the bit field of the DCI that are configured for the UE 120 to determine the SFI for each configured BWP for the UE 120. In some aspects, a location in the bit field of the DCI that is configured for the UE 120 may be associated with more than one BWP configured for the UE 120. In this case, the multiple BWPs associated with a location in the bit field may have the same slot format (e.g., the SFI in the location in the bit field of the DCI may be applied to each of the multiple BWPs associated with the location).

As further shown in FIG. 4, and by reference number 415, the UE 120 and the base station 110 may communicate in the active BWPs using the respective BWP-specific DL-UL pattern associated with each active BWP. In some aspects, the UE 120 and the base station 110 may communicate using multiple active BWPs at the same time. For example, the active BWPs may include a first active BWP configured with a first BWP-specific DL-UL pattern and a second active BWP configured with a second BWP-specific DL-UL pattern. In this case, the UE 120 and the base station 110 may communicate in a half-duplex mode in in slots having the same slot format in the first BWP-specific DL-UL pattern and the second BWP-specific DL-UL pattern, and the UE 120 and the base station 110 may communicate in a full-duplex mode in slots having different slot formats in the first BWP-specific DL-UL pattern and the second BWP-specific DL-UL pattern. For example, in a case in which BWP1 and BWP2 shown in FIG. 4 are the active BWPs, the UE 120 may receive downlink communications from the base station 110 in BWP1 and BWP2 in a first slot (e.g., half-duplex mode operation), the UE 120 may receive downlink communications from the base station 110 in BWP1 and transmit uplink communications to the UE 120 in BWP2 in a second slot and a third slot (e.g., full-duplex mode operation), and the UE 120 may transmit uplink communications in BWP1 and BWP2 in a fourth slot (e.g., half-duplex mode operation).

Although the illustration in FIG. 4 shows non-overlapping BWPs, for operation in an SBFD mode, it is understood that in some aspects, in a case in which the first active BWP overlaps with the second active BWP, the UE 120 and the base station 110 may communicate in an IBFD mode in the slots having different slot formats in the first BWP-specific DL-UL pattern and the second BWP-specific DL-UL pattern. In some aspects, in a case in which the first active BWP is adjacent to the second active BWP or the first active BWP is separated from the second active BWP by a guard band, the UE 120 and the base station 110 may communicate in an SBFD mode in the slots having different slot formats in the first BWP-specific DL-UL pattern and the second BWP-specific DL-UL pattern. An IBFD mode may use different transmit or receive parameters (e.g., power control, etc.) than an SBFD mode. An FD mode (such as an IBFD mode or an SBFD mode) may use different transmit or receive parameters than an HD mode.

In some aspects, in slots in which the active BWPs operate in the same direction (e.g., slots having the same slot format in the first BWP-specific DL-UL pattern and the second BWP-specific DL-UL pattern), the UE 120 and the base station 110 may communicate in the half-duplex mode (e.g., downlink or uplink) in a combined BWP that includes the first BWP and the second BWP. For example, the UE 120 and the base station 110 may communicate in the combined BWP in slots having the same slot format in the first BWP-specific DL-UL pattern and the second BWP-specific DL-UL pattern, in cases in which the first active BWP and the second active BWP are adjacent, partially overlapping, and/or separated by a guard band.

In some aspects, in a case in which the first active BWP and the second active BWP are separated by a guard band, the combined BWP may include the first active BWP, the second active BWP, and the guard band. For example, as shown in FIG. 4, and by reference number 420, in a case in which the active BWPs (BWP1 and BWP2) are separated by a guard band (GB), the UE 120 may receive downlink communications from the base station 110 (e.g., in the half-duplex mode) in a first slot in a combined BWP including BWP1, BWP2, and the guard band, and the UE 120 may transmit uplink communications to the base station 110 (e.g., in the half-duplex mode) in a fourth slot in the combined BWP including BWP1, BWP2, and the guard band. In some aspects, the use of the combined BWP (including the guard band) for active BWPs separated by a guard band may be based at least in part on a determination of whether a size (e.g., in terms of resource blocks (RBs)) of the guard band between the active BWPs satisfies a threshold. In this case, the threshold may be configured for the UE 120 in an RRC configuration (e.g., the configuration of the BWPs or another RRC configuration) received from the base station 110.

In some aspects, the UE 120 may apply configurations (e.g., physical downlink shared channel (PDSCH) configurations, physical uplink shared channel (PUSCH) configurations, or the like) of the combined BWP (e.g., other than the central frequency and start and end RBs) that are the same as configurations of one or more of the active BWPs included in the combined BWP. For example, which of the active BWPs to use to set the configurations for the combined BWP may be configured for UE 120 (e.g., in the RRC configuration of the BWPs).

As described above, the UE 120 may receive, from the base station 110, a configuration of a plurality of BWPs in a frequency band, and the configuration may identify a respective BWP-specific DL-UL pattern for each BWP of the plurality of BWPs. The UE 120 and the base station 110 may communicate in one or more active BWPs using the respective BWP-specific DL-UL patterns for each of the one or more active BWPs. In some aspects, multiple BWPs may be activated at the same time and used together to enable full-duplex operation in one or more slots, and different combinations of BWPs may be activated or deactivated to achieve different configurations for full-duplex operation with low signaling overhead. As a result, the flexibility of allocating resources for full-duplex communications may be increased, which may result in network speed and decreased traffic latency for full-duplex communications.

While some techniques described in FIG. 4 are described in the context of enabling full-duplex communication between a UE and a base station (where both the UE and the base station are communicating in full duplex with each other), these techniques can also be used to enable communication between a single UE communicating in full-duplex and multiple UEs or base stations (such as multiple transmit-receive points), where each base station is communicating in half duplex, and to enable communication between a single base station communicating in full duplex and multiple UEs, where each UE is communicating in half duplex. Furthermore, these techniques can be applied for sidelink communications between UEs and for wireless communications between base stations.

As indicated above, FIG. 4 is provided as an example. Other examples may differ from what is described with respect to FIG. 4.

Figure 5:
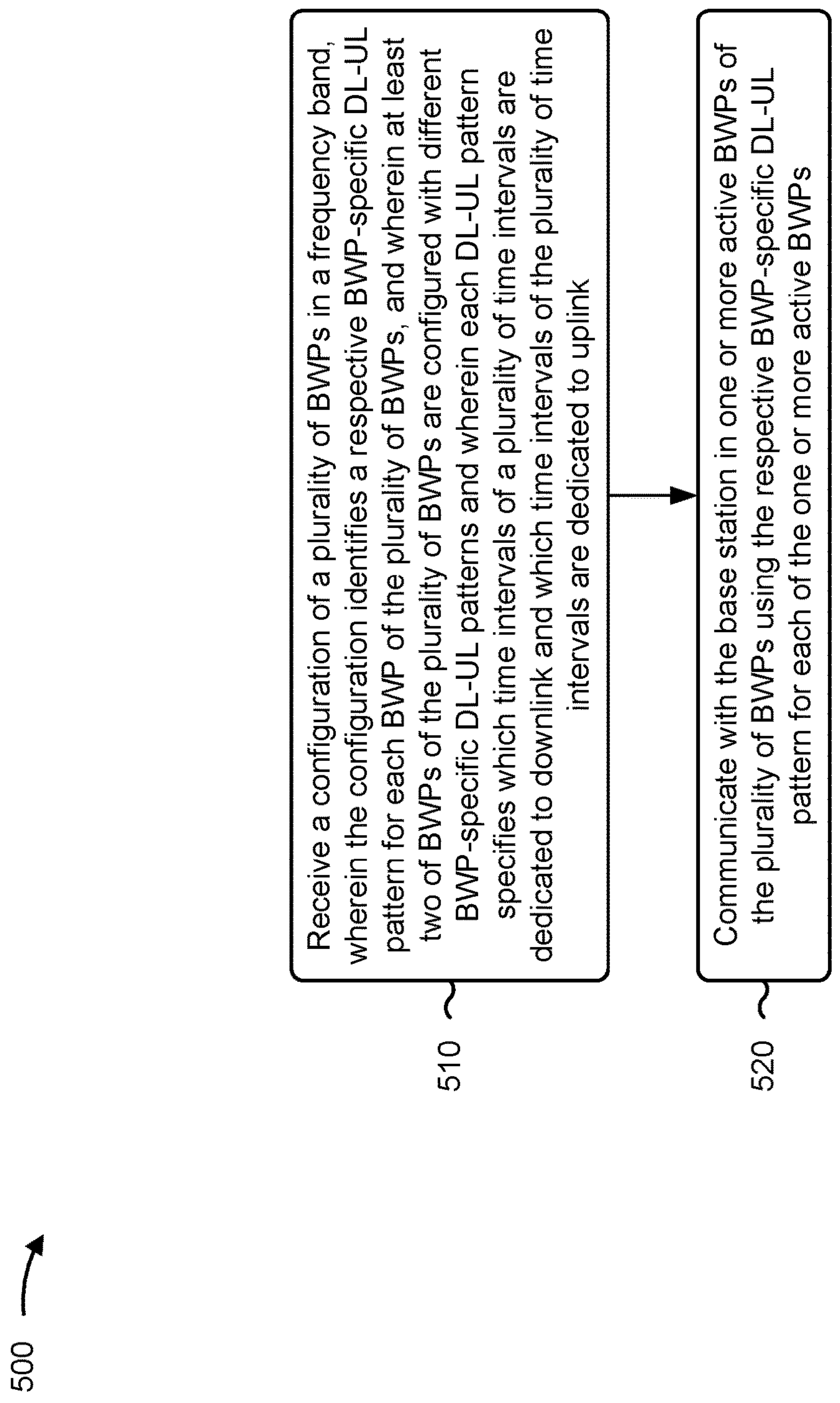
FIGS. 5-6 are diagrams illustrating example processes associated with BWP-specific DL-UL patterns, in accordance with the present disclosure.

FIG. 5 is a diagram illustrating an example process 500 performed, for example, by a user equipment (UE), in accordance with the present disclosure. Example process 500 is an example where the UE (e.g., UE 120) performs operations associated with BWP-specific DL-UL patterns.

As shown in FIG. 5, in some aspects, process 500 may include receiving, from a base station, a configuration of a plurality of BWPs in a frequency band, wherein the configuration identifies a respective BWP-specific DL-UL pattern for each BWP of the plurality of BWPs. and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink (block 510). For example, the UE (e.g., using communication manager 140 and/or reception component 702, depicted in FIG. 7) may receive, from a base station, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink, as described above, for example, with reference to FIG. 4.

As further shown in FIG. 5, in some aspects, process 500 may include communicating with the base station in one or more active BWPs of the plurality of BWPs using the respective BWP-specific DL-UL pattern for each of the one or more active BWPs (block 520). For example, the UE (e.g., using communication manager 140, reception component 702, and/or transmission component 704, depicted in FIG. 7) may communicate with the base station in one or more active BWPs of the plurality of BWPs using the respective BWP-specific DL-UL pattern for each of the one or more active BWPs, as described above, for example, with reference to FIG. 4.

Process 500 may include additional aspects, such as any single aspect or any combination of aspects described below and/or in connection with one or more other processes described elsewhere herein.

In a first aspect, the one or more active BWPs include multiple BWPs of the plurality of BWPs at a same time.

In a second aspect, alone or in combination with the first aspect, for each of the plurality of BWPs, the respective BWP-specific DL-UL pattern indicates a pattern of time-interval formats for the plurality of time intervals and the pattern of time-interval formats includes one or more downlink time intervals and one or more uplink time intervals.

In a third aspect, alone or in combination with one or more of the first and second aspects, the one or more active BWPs include a first active BWP configured with a first BWP-specific DL-UL pattern and a second active BWP configured with a second BWP-specific DL-UL pattern, and communicating with the base station includes communicating with the base station in a half-duplex mode in time intervals having a same time-interval format in the first BWP-specific DL-UL pattern and the second BWP-specific DL-UL pattern, and communicating with the base station in a full-duplex mode in time intervals having different time-interval formats in the first BWP-specific DL-UL pattern and the second BWP-specific DL-UL pattern.

In a fourth aspect, alone or in combination with one or more of the first and third aspects, the first active BWP overlaps with the second active BWP, and communicating with the base station in the full-duplex mode includes communicating with the base station in an IBFD mode in time intervals having different time-interval formats in the first BWP-specific DL-UL pattern and the second BWP-specific DL-UL pattern.

In a fifth aspect, alone or in combination with one or more of the first through fourth aspects, the first active BWP is adjacent to the second active BWP or the first active BWP is separated from the second active BWP by a guard band, and communicating with the base station in the full-duplex mode includes communicating with the base station in an SBFD mode in time intervals having different time-interval formats in the first BWP-specific DL-UL pattern and the second BWP-specific DL-UL pattern.

In a sixth aspect, alone or in combination with one or more of the first through fifth aspects, communicating with the base station in the half-duplex mode includes communicating with the base station in the half-duplex mode in a combined BWP that includes the first BWP and the second BWP in the time intervals having the same time-interval format in the first BWP-specific DL-UL pattern and the second BWP-specific DL-UL pattern.

In a seventh aspect, alone or in combination with one or more of the first through sixth aspects, the first BWP and the second BWP are separated by a guard band, and the combined BWP includes the first BWP, the second BWP, and the guard band.

In an eighth aspect, alone or in combination with one or more of the first through seventh aspects, communicating with the base station in the half-duplex mode in a combined BWP communicating with the base station in the half-duplex mode in the combined BWP that includes the first BWP, the second BWP, and the guard band based at least in part on a determination that a size of the guard band satisfies a threshold.

In a ninth aspect, alone or in combination with one or more of the first through eighth aspects, for one or more BWPs of the plurality of BWPs, the pattern of time-interval formats further includes one or more flexible time intervals, and process 500 includes receiving, from the base station, a SFI that indicates, for at least one BWP of the one or more BWPs, that a flexible time interval in the respective BWP-specific DL-UL pattern configured for the at least one BWP is to be used as a downlink time interval or an uplink time interval.

In a tenth aspect, alone or in combination with one or more of the first through a ninth aspects, the SFI is included in DCI, and the DCI further includes an indication of the at least one BWP to which the SFI is to be applied.

In an eleventh aspect, alone or in combination with one or more of the first through tenth aspects, the SFI is included in DCI, and a location of the SFI in a bit field of the DCI indicates the at least one BWP to which the SFI is applied.

In a twelfth aspect, alone or in combination with one or more of the first through eleventh aspects, the plurality of time intervals comprise a plurality of slots, and wherein the DL-UL pattern specifies which slots are dedicated to uplink and which slots are dedicated to downlink.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
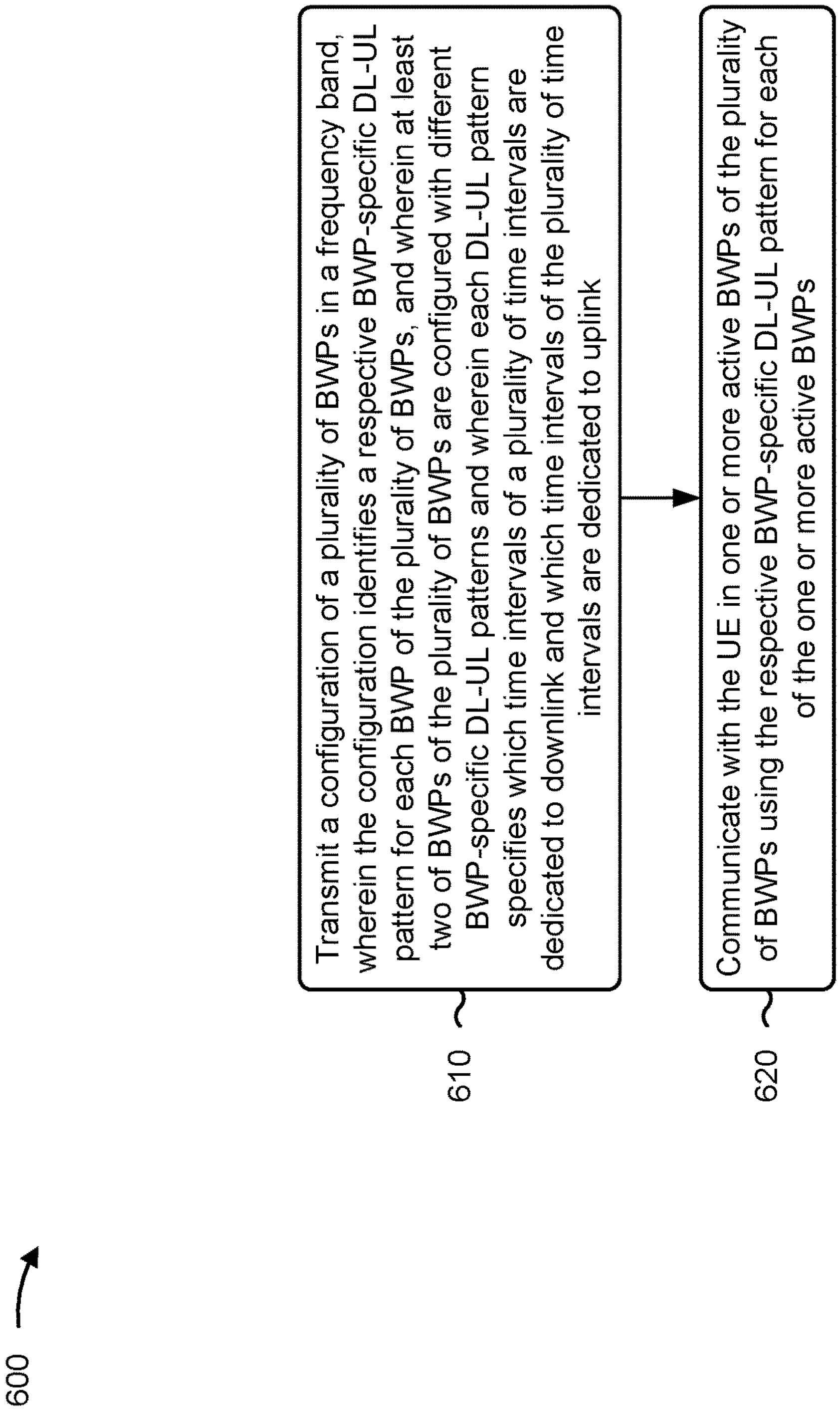

FIG. 6 is a diagram illustrating an example process 600 performed, for example, by a base station, in accordance with the present disclosure. Example process 600 is an example where the base station (e.g., base station 110) performs operations associated with BWP-specific DL-UL patterns.

As shown in FIG. 6, in some aspects, process 600 may include transmitting, to a UE, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink (block 610). For example, the base station (e.g., using communication manager 150 and/or transmission component 804, depicted in FIG. 8) may transmit, to a UE, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink, as described above, for example, with reference to FIG. 4.

As further shown in FIG. 6, in some aspects, process 600 may include communicating with the UE in one or more active BWPs of the plurality of BWPs using the respective BWP-specific DL-UL pattern for each of the one or more active BWPs (block 620). For example, the base station (e.g., using communication manager 150, reception component 802, and/or transmission component 804, depicted in FIG. 8) may communicate with the UE in one or more active BWPs of the plurality of BWPs using the respective BWP-specific DL-UL pattern for each of the one or more active BWPs, as described above, for example, with reference to FIG. 4.

Process 600 may include additional aspects, such as any single aspect or any combination of aspects described below and/or in connection with one or more other processes described elsewhere herein.

In a first aspect, the one or more active BWPs include multiple BWPs of the plurality of BWPs at a same time.

In a second aspect, alone or in combination with the first aspect, for each of the plurality of BWPs, the respective BWP-specific DL-UL pattern indicates a pattern of time-interval formats for the plurality of time intervals and the pattern of time-interval formats includes one or more downlink time intervals and one or more uplink time intervals.

In a third aspect, alone or in combination with one or more of the first and second aspects, the one or more active BWPs include a first active BWP configured with a first BWP-specific DL-UL pattern and a second active BWP configured with a second BWP-specific DL-UL pattern, and communicating with the UE includes communicating with the UE in a half-duplex mode in time intervals having a same time-interval format in the first BWP-specific DL-UL pattern and the second BWP-specific DL-UL pattern, and communicating with the UE in a full-duplex mode in time intervals having different time-interval formats in the first BWP-specific DL-UL pattern and the second BWP-specific DL-UL pattern.

In a fourth aspect, alone or in combination with one or more of the first through third aspects, the first active BWP overlaps with the second active BWP, wherein communicating with the UE in the full-duplex mode includes communicating with the UE in an IBFD mode in time intervals having different time-interval formats in the first BWP-specific DL-UL pattern and the second BWP-specific DL-UL pattern.

In a fifth aspect, alone or in combination with one or more of the first through fourth aspects, the first active BWP is adjacent to the second active BWP or the first active BWP is separated from the second active BWP by a guard band, wherein communicating with the UE in the full-duplex mode includes communicating with the UE in an SBFD mode in time intervals having different time-interval formats in the first BWP-specific DL-UL pattern and the second BWP-specific DL-UL pattern.

In a sixth aspect, alone or in combination with one or more of the first through fifth aspects, communicating with the UE in the half-duplex mode includes communicating with the UE in the half-duplex mode in a combined BWP that includes the first BWP and the second BWP in the time intervals having the same time-interval format in the first BWP-specific DL-UL pattern and the second BWP-specific DL-UL pattern.

In a seventh aspect, alone or in combination with one or more of the first through sixth aspects, the first BWP and the second BWP are separated by a guard band, and the combined BWP includes the first BWP, the second BWP, and the guard band.

In an eighth aspect, alone or in combination with one or more of the first through seventh aspects, communicating with the UE in the half-duplex mode in a combined BWP communicating with the UE in the half-duplex mode in the combined BWP that includes the first BWP, the second BWP, and the guard band based at least in part on a determination that a size of the guard band satisfies a threshold.

In a ninth aspect, alone or in combination with one or more of the first through eighth aspects, for one or more BWPs of the plurality of BWPs, the pattern of time-interval formats further includes one or more flexible time intervals, and process 600 includes transmitting, to the UE, an SFI that indicates, for at least one BWP of the one or more BWPs, that a flexible time interval in the respective BWP-specific DL-UL pattern configured for the at least one BWP is to be used as a downlink time interval or an uplink time interval.

In a tenth aspect, alone or in combination with one or more of the first through ninth aspects, the SFI is included in DCI, and the DCI further includes an indication of the at least one BWP to which the SFI is to be applied.

In an eleventh aspect, alone or in combination with one or more of the first through tenth aspects, the SFI is included in DCI, and a location of the SFI in a bit field of the DCI indicates the at least one BWP to which the SFI is applied.

In a twelfth aspect, alone or in combination with one or more of the first through eleventh aspects, the plurality of time intervals comprise a plurality of slots, and wherein the DL-UL pattern specifies which slots are dedicated to uplink and which slots are dedicated to downlink.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
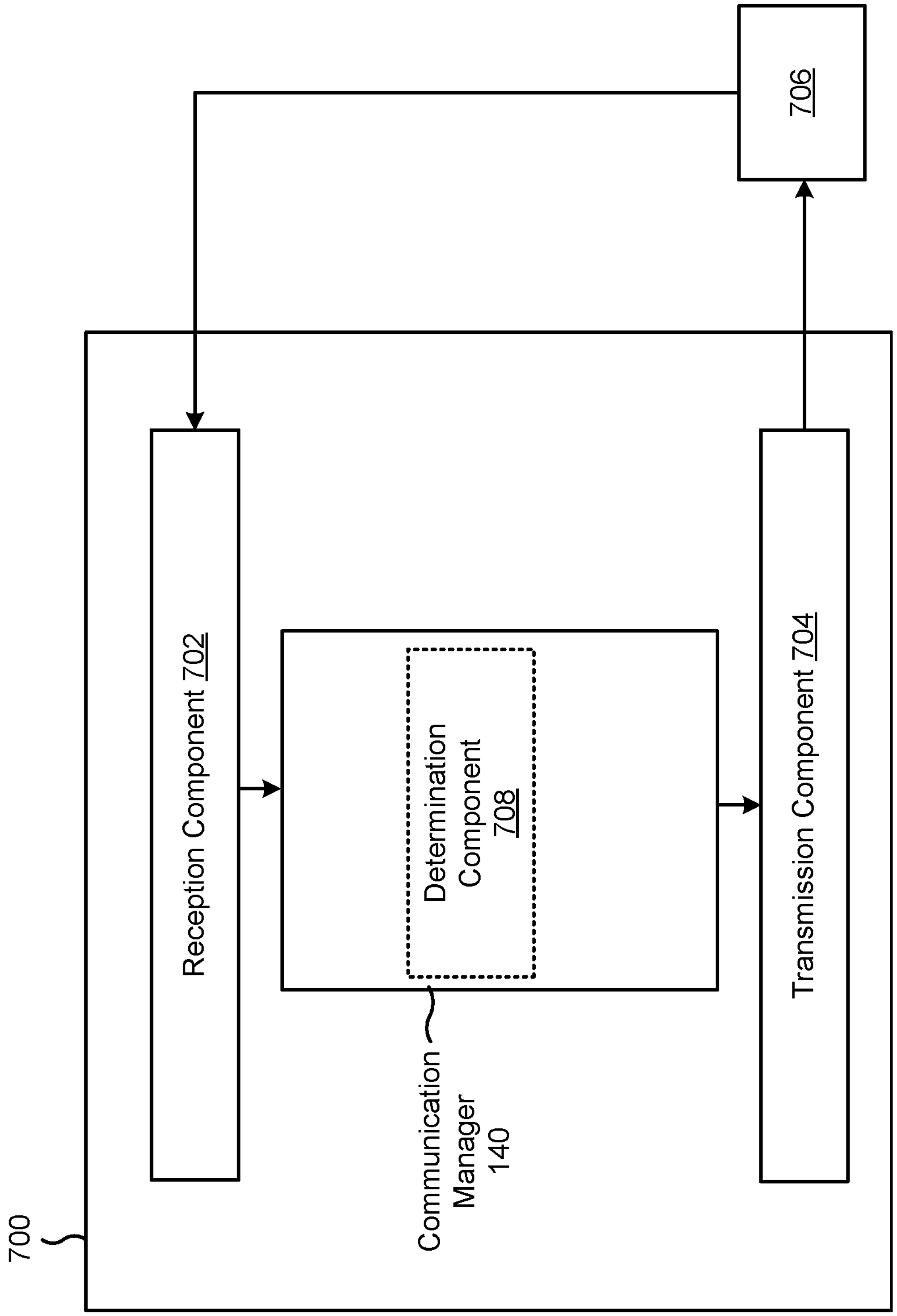
FIGS. 7-8 are diagrams of example apparatuses for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may a determination component 708, among other examples.

In some aspects, the apparatus 700 may be configured to perform one or more operations described herein in connection with FIG. 4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive, receive, from a base station, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The reception component 702 and/or the transmission component 704 may communicate with the base station in one or more active BWPs of the plurality of BWPs using the respective BWP-specific DL-UL pattern for each of the one or more active BWPs.

The reception component 702 may receive, from the base station, an SFI that indicates, for at least one BWP of the one or more BWPs, that a flexible time interval in the respective BWP-specific DL-UL pattern configured for the at least one BWP is to be used as a downlink time interval or an uplink time interval.

The determination component 708 may determine the at least one BWP, of the plurality of BWPs, to which the SFI is applied.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
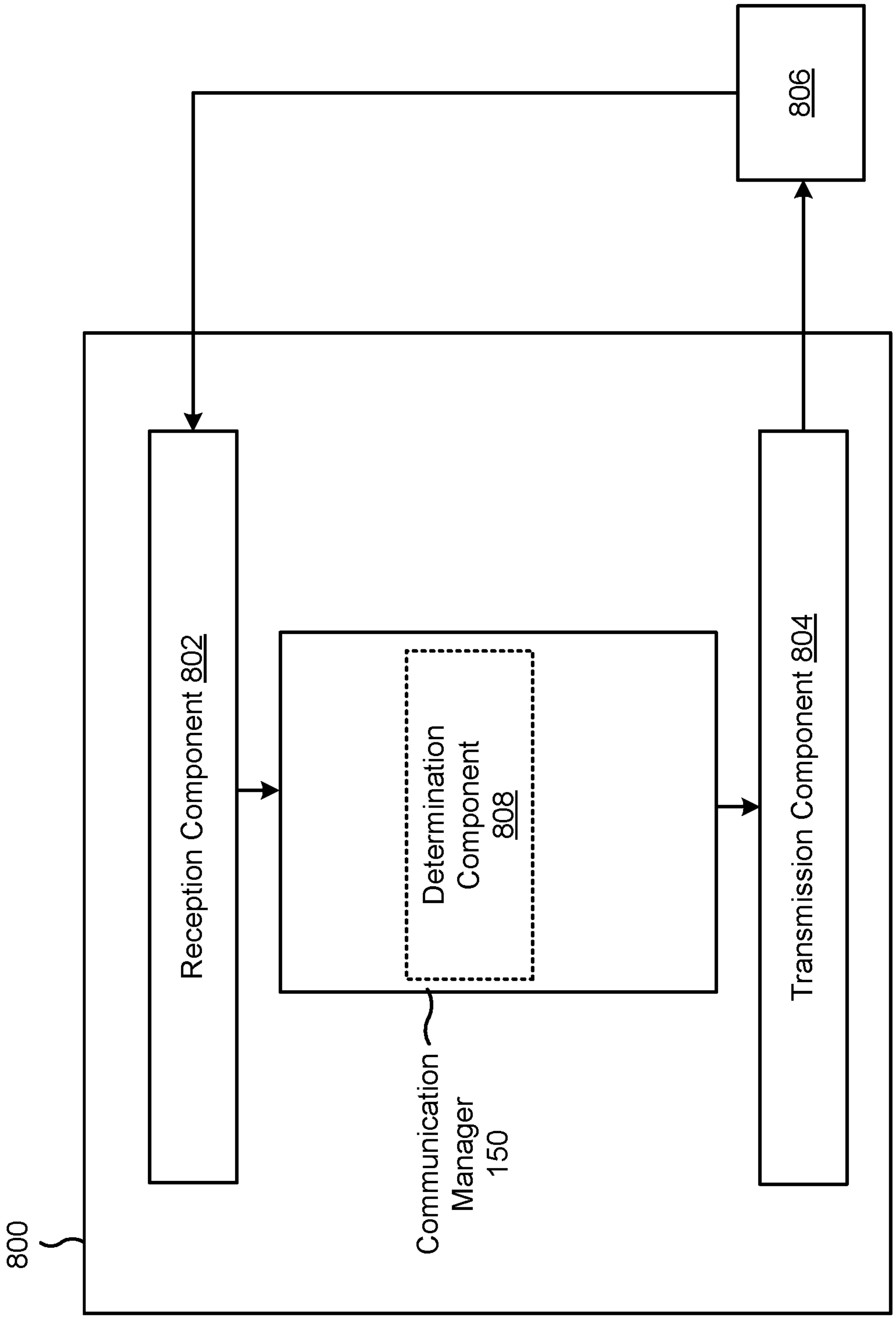

FIG. 8 is a diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a determination component 808, among other examples.

In some aspects, the apparatus 800 may be configured to perform one or more operations described herein in connection with FIG. 4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The transmission component 804 may transmit, to a UE, a configuration of a plurality of BWPs in a frequency band, wherein the configuration identifies a respective BWP-specific DL-UL pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink. The reception component 802 and/or the transmission component 804 may communicate with the UE in one or more active BWPs of the plurality of BWPs using the respective BWP-specific DL-UL pattern for each of the one or more active BWPs.

The determination component 808 may determine the one or more active BWPs.

The transmission component 804 may transmit, to the UE, an SFI that indicates, for at least one BWP of the one or more BWPs, that a flexible time interval in the respective BWP-specific DL-UL pattern configured for the at least one BWP is to be used as a downlink time interval or an uplink time interval.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, from a base station, a configuration of a plurality of bandwidth parts (BWPs) in a frequency band, wherein the configuration identifies a respective BWP-specific downlink (DL)-uplink (UL) pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink; and communicating with the base station in one or more active BWPs of the plurality of BWPs using the respective BWP-specific DL-UL pattern for each of the one or more active BWPs.

Aspect 2: The UE of claim 1, wherein the plurality of time intervals comprise a plurality of slots, and wherein the DL-UL pattern specifies which slots are dedicated to uplink and which slots are dedicated to downlink.

Aspect 3: The method of any of Aspects 1-2, wherein the one or more active BWPs include multiple BWPs of the plurality of BWPs at a same time.

Aspect 4: The method of any of Aspects 1-3, wherein, for each of the plurality of BWPs, the respective BWP-specific DL-UL pattern indicates a pattern of time-interval formats for the plurality of time intervals and the pattern of time-interval formats includes one or more downlink time intervals and one or more uplink time intervals.

Aspect 5: The method of Aspect 4, wherein the one or more active BWPs include a first active BWP configured with a first BWP-specific DL-UL pattern and a second active BWP configured with a second BWP-specific DL-UL pattern, and wherein communicating with the base station comprises: communicating with the base station in a half-duplex mode in time intervals having a same time-interval format in the first BWP-specific DL-UL pattern and the second BWP-specific DL-UL pattern; and communicating with the base station in a full-duplex mode in time intervals having different time-interval formats in the first BWP-specific DL-UL pattern and the second BWP-specific DL-UL pattern.

Aspect 6: The method of Aspect 5, wherein the first active BWP overlaps with the second active BWP, and wherein communicating with the base station in the full-duplex mode comprises: communicating with the base station in an in-band full-duplex (IBFD) mode in time intervals having different time-interval formats in the first BWP-specific DL-UL pattern and the second BWP-specific DL-UL pattern.

Aspect 7: The method of Aspect 5, wherein the first active BWP is adjacent to the second active BWP or the first active BWP is separated from the second active BWP by a guard band, and wherein communicating with the base station in the full-duplex mode comprises: communicating with the base station in a sub-band full-duplex (SBFD) mode in time intervals having different time-interval formats in the first BWP-specific DL-UL pattern and the second BWP-specific DL-UL pattern.

Aspect 8: The method of any of Aspects 5-7, wherein communicating with the base station in the half-duplex mode comprises: communicating with the base station in the half-duplex mode in a combined BWP that includes the first active BWP and the second active BWP in the time intervals having the same time-interval format in the first BWP-specific DL-UL pattern and the second BWP-specific DL-UL pattern, wherein the first active BWP and the second active BWP are separated by a guard band, and the combined BWP includes the first active BWP, the second active BWP, and the guard band.

Aspect 9: The method of Aspect 8, wherein communicating with the base station in the half-duplex mode in a combined BWP comprises: communicating with the base station in the half-duplex mode in the combined BWP that includes the first active BWP, the second active BWP, and the guard band based at least in part on a determination that a size of the guard band satisfies a threshold.

Aspect 10: The method of any of Aspects 4-9, wherein, for one or more BWPs of the plurality of BWPs, the pattern of time-interval formats further includes one or more flexible time intervals, and wherein the method further comprises: receiving, from the base station, a slot format indicator (SFI) that indicates, for at least one BWP of the one or more BWPs, that a flexible time interval in the respective BWP-specific DL-UL pattern configured for the at least one BWP is to be used as a downlink time interval or an uplink time interval.

Aspect 11: The method of Aspect 10, wherein the SFI is included in downlink control information (DCI), and the DCI further includes an indication of the at least one BWP to which the SFI is to be applied.

Aspect 12: The method of Aspect 10, wherein the SFI is included in downlink control information (DCI), and a location of the SFI in a bit field of the DCI indicates the at least one BWP to which the SFI is applied.

Aspect 13: A method of wireless communication performed by a base station, comprising: transmitting, to a user equipment (UE), a configuration of a plurality of bandwidth parts (BWPs) in a frequency band, wherein the configuration identifies a respective BWP-specific downlink (DL)-uplink (UL) pattern for each BWP of the plurality of BWPs, and wherein at least two of BWPs of the plurality of BWPs are configured with different BWP-specific DL-UL patterns and wherein each DL-UL pattern specifies which time intervals of a plurality of time intervals are dedicated to downlink and which time intervals of the plurality of time intervals are dedicated to uplink; and communicating with the UE in one or more active BWPs of the plurality of BWPs using the respective BWP-specific DL-UL pattern for each of the one or more active BWPs.

Aspect 14: The method of claim 13, wherein the plurality of time intervals comprise a plurality of slots, and wherein the DL-UL pattern specifies which slots are dedicated to uplink and which slots are dedicated to downlink Aspect 15: The method of any of Aspects 14, wherein the one or more active BWPs include multiple BWPs of the plurality of BWPs at a same time.

Aspect 16: The method of any of Aspects 13-15, wherein, for each of the plurality of BWPs, the respective BWP-specific DL-UL pattern indicates a pattern of time-interval formats for the plurality of time intervals and the pattern of time-interval formats includes one or more downlink time intervals and one or more uplink time intervals.

Aspect 17: The method of Aspect 16, wherein the one or more active BWPs include a first active BWP configured with a first BWP-specific DL-UL pattern and a second active BWP configured with a second BWP-specific DL-UL pattern, and wherein communicating with the UE comprises: communicating with the UE in a half-duplex mode in time intervals having a same time-interval format in the first BWP-specific DL-UL pattern and the second BWP-specific DL-UL pattern; and communicating with the UE in a full-duplex mode in time intervals having different time-interval formats in the first BWP-specific DL-UL pattern and the second BWP-specific DL-UL pattern.

Aspect 18: The method of Aspect 17, wherein the first active BWP overlaps with the second active BWP, and wherein communicating with the UE in the full-duplex mode comprises: communicating with the UE in an in-band full-duplex (IBFD) mode in time intervals having different time-interval formats in the first BWP-specific DL-UL pattern and the second BWP-specific DL-UL pattern.

Aspect 19: The method of Aspect 17, wherein the first active BWP is adjacent to the second active BWP or the first active BWP is separated from the second active BWP by a guard band, and wherein communicating with the UE in the full-duplex mode comprises: communicating with the UE in a sub-band full-duplex (SBFD) mode in time intervals having different time-interval formats in the first BWP-specific DL-UL pattern and the second BWP-specific DL-UL pattern.

Aspect 20: The method of any of Aspects 17-19, wherein communicating with the UE in the half-duplex mode comprises: communicating with the UE in the half-duplex mode in a combined BWP that includes the first active BWP and the second active BWP in the time intervals having the same time-interval format in the first BWP-specific DL-UL pattern and the second BWP-specific DL-UL pattern, wherein the first active BWP and the second active BWP are separated by a guard band, and the combined BWP includes the first active BWP, the second active BWP, and the guard band.

Aspect 21: The method of Aspect 20, wherein communicating with the UE in the half-duplex mode in a combined BWP comprises: communicating with the UE in the half-duplex mode in the combined BWP that includes the first active BWP, the second active BWP, and the guard band based at least in part on a determination that a size of the guard band satisfies a threshold.

Aspect 22: The method of any of Aspects 16-21, wherein, for one or more BWPs of the plurality of BWPs, the pattern of time-interval formats further includes one or more flexible time intervals, and wherein the method further comprises: transmitting, to the UE, a slot format indicator (SFI) that indicates, for at least one BWP of the one or more BWPs, that a flexible time interval in the respective BWP-specific DL-UL pattern configured for the at least one BWP is to be used as a downlink time interval or an uplink time interval.

Aspect 23: The method of Aspect 22, wherein the SFI is included in downlink control information (DCI), and the DCI further includes an indication of the at least one BWP to which the SFI is to be applied.

Aspect 24: The method of Aspect 22, wherein the SFI is included in downlink control information (DCI), and a location of the SFI in a bit field of the DCI indicates the at least one BWP to which the SFI is applied.

Aspect 25: An apparatus for wireless communication at a device, comprising a processor; memory coupled with the processor; and instructions stored in the memory and executable by the processor to cause the apparatus to perform the method of one or more of Aspects 1-12.

Aspect 26: An apparatus for wireless communication at a device, comprising a processor; memory coupled with the processor; and instructions stored in the memory and executable by the processor to cause the apparatus to perform the method of one or more of Aspects 13-24.

Aspect 27: A device for wireless communication, comprising a memory and one or more processors coupled to the memory, the one or more processors configured to perform the method of one or more of Aspects 1-12.

Aspect 28: A device for wireless communication, comprising a memory and one or more processors coupled to the memory, the one or more processors configured to perform the method of one or more of Aspects 13-24.

Aspect 29: An apparatus for wireless communication, comprising at least one means for performing the method of one or more of Aspects 1-12.

Aspect 30: An apparatus for wireless communication, comprising at least one means for performing the method of one or more of Aspects 13-24.

Aspect 31: A non-transitory computer-readable medium storing code for wireless communication, the code comprising instructions executable by a processor to perform the method of one or more of Aspects 1-12.

Aspect 32: A non-transitory computer-readable medium storing code for wireless communication, the code comprising instructions executable by a processor to perform the method of one or more of Aspects 13-24.

Aspect 33: A non-transitory computer-readable medium storing a set of instructions for wireless communication, the set of instructions comprising one or more instructions that, when executed by one or more processors of a device, cause the device to perform the method of one or more of Aspects 1-12.

Aspect 34: A non-transitory computer-readable medium storing a set of instructions for wireless communication, the set of instructions comprising one or more instructions that, when executed by one or more processors of a device, cause the device to perform the method of one or more of Aspects 13-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive, from a base station operating in a full-duplex (FD) mode, a configuration of a plurality of bandwidth parts (BWPs), the configuration identifying:

a first BWP-specific downlink (DL)-uplink (UL) pattern for a first set of BWPs of the plurality of BWPs, and a second BWP-specific DL-UL pattern for a second set of BWPs of the plurality of BWPs, wherein the second BWP-specific DL-UL pattern is different than the first BWP-specific DL-UL pattern; and communicate, in a half-duplex mode or a full-duplex mode, with the base station in the plurality of BWPs using the first BWP-specific DL-UL pattern and the second BWP-specific DL-UL pattern, wherein whether to communicate in the half-duplex mode or the full-duplex mode in one or more time intervals is based at least in part on whether a time-interval format in the first BWP-specific DL-UL pattern corresponding to the one or more time intervals is the same as or different from a time-interval format in the second BWP-specific DL-UL pattern corresponding to the one or more time intervals.

2. The UE of claim 1, wherein the first BWP-specific DL-UL pattern specifies which slots of a plurality of slots are dedicated to downlink and which slots of the plurality of slots are dedicated to uplink.

3. The UE of claim 1, wherein the plurality of BWPs includes BWPs that are activated at a same time.

4. The UE of claim 1, wherein, for each of the plurality of BWPs, a respective BWP-specific DL-UL pattern indicates a pattern of time-interval formats for a plurality of time intervals and the pattern of time-interval formats includes one or more downlink time intervals and one or more uplink time intervals.

5. The UE of claim 1, wherein the plurality of BWPs includes a first active BWP and a second active BWP, and wherein the one or more processors, to communicate with the base station, are configured to:

communicate with the base station in an in-band full-duplex (IBFD) mode in time intervals having different time-interval formats in the first BWP-specific DL-UL pattern and the second BWP-specific DL-UL pattern, wherein the first active BWP overlaps with the second active BWP, or communicate with the base station in a sub-band full-duplex (SBFD) mode in time intervals having different time-interval formats in the first BWP-specific DL-UL pattern and the second BWP-specific DL-UL pattern, wherein the first active BWP is adjacent to the second active BWP or the first active BWP is separated from the second active BWP by a guard band.

6. The UE of claim 1, wherein the one or more processors, to communicate with the base station, are configured to:

communicate, in the half-duplex mode, with the base station in a combined BWP that includes a first active BWP and a second active BWP in time intervals having a same time-interval format in the first BWP-specific DL-UL pattern and the second BWP-specific DL-UL pattern, wherein the first active BWP and the second active BWP are separated by a guard band, and the combined BWP includes the first active BWP, the second active BWP, and the guard band.

7. The UE of claim 6, wherein the one or more processors, to communicate with the base station, are configured to:

communicate with the base station in the combined BWP that includes the first active BWP, the second active BWP, and the guard band based at least in part on a determination that a size of the guard band satisfies a threshold.

8. The UE of claim 1, wherein the configuration is included in a radio resource control (RRC) message.

9. The UE of claim 1, wherein, for one or more BWPs of the plurality of BWPs, the pattern of time-interval formats further includes one or more flexible time intervals, and wherein the one or more processors are further configured to:

receive, from the base station, a slot format indicator (SFI) that indicates, for at least one BWP of the one or more BWPs, that a flexible time interval in a respective BWP-specific DL-UL pattern configured for the at least one BWP is to be used as a downlink time interval or an uplink time interval.

10. The UE of claim 9, wherein the SFI is included in downlink control information (DCI), and the DCI further includes an indication of the at least one BWP to which the SFI is to be applied.

11. A base station for wireless communication, comprising:

a memory; and one or more processors, coupled to the memory, configured to:

transmit, to a user equipment (UE) operating in a full-duplex (FD) mode, a configuration of a first set of bandwidth parts (BWPs) and a second set of BWPs, wherein the configuration identifies a first BWP-specific downlink (DL)-uplink (UL) pattern for the first set of BWPs and a second BWP-specific DL-UL pattern for the second set of BWPs that is different than the first BWP-specific DL-UL pattern; and communicate, in a half-duplex mode or a full-duplex mode, with the UE in multiple active BWPs of the plurality of BWPs using the first BWP-specific DL-UL pattern and the second BWP-specific DL-UL pattern, wherein whether to communicate in the half-duplex mode or the full-duplex mode in one or more time intervals is based at least in part on whether a time-interval format in the first BWP-specific DL-UL pattern corresponding to the one or more time intervals is the same as or different from a time-interval format in the second BWP-specific DL-UL pattern corresponding to the one or more time intervals.

12. The base station of claim 11, wherein, for each of the plurality of BWPs, a respective BWP-specific DL-UL pattern indicates a pattern of time-interval formats for a plurality of time intervals and the pattern of time-interval formats includes one or more downlink time intervals and one or more uplink time intervals.

13. The base station of claim 11, wherein the multiple active BWPs include a first active BWP configured with a first BWP-specific DL-UL pattern and a second active BWP configured with a second BWP-specific DL-UL pattern, and wherein the one or more processors, to communicate with the UE, are configured to:

communicate with the UE in the half-duplex mode in the one or more time intervals having a same time-interval format in the first BWP-specific DL-UL pattern and the second BWP-specific DL-UL pattern; and communicate with the UE in the full-duplex mode in the one or more time intervals having different time-interval formats in the first BWP-specific DL-UL pattern and the second BWP-specific DL-UL pattern.

14. The base station of claim 11, wherein, for one or more BWPs of the plurality of BWPs, the pattern of time-interval formats further includes one or more flexible time intervals, and wherein the one or more processors are further configured to:

transmit, to the UE, a slot format indicator (SFI) that indicates, for at least one BWP of the one or more BWPs, that a flexible time interval in a respective BWP-specific DL-UL pattern configured for the at least one BWP is to be used as a downlink time interval or an uplink time interval.

15. A method of wireless communication performed by a user equipment (UE), comprising:

receiving, from a base station operating in a full-duplex (FD) mode, a configuration of a plurality of bandwidth parts (BWPs), the configuration identifying:

a first BWP-specific downlink (DL)-uplink (UL) pattern for a first set of BWPs of the plurality of BWPs, a second BWP-specific DL-UL pattern for a second set of BWPs of the plurality of BWPs, wherein the second BWP specific DL-UL pattern is different than the first BWP-specific DL-UL pattern; and communicating, in a half-duplex mode or a full-duplex mode, with the base station in the plurality of BWPs using the first BWP-specific DL-UL pattern and the second BWP-specific DL-UL pattern, wherein whether to communicate in the half-duplex mode or the full-duplex mode in one or more time intervals is based at least in part on whether a time-interval format in the first BWP-specific DL-UL pattern corresponding to the one or more time intervals is the same as or different from a time-interval format in the second BWP-specific DL-UL pattern corresponding to the one or more time intervals.

16. The method of claim 15, wherein the first BWP-specific DL-UL pattern specifies which slots of a plurality of slots are dedicated to downlink and which slots of the plurality of slots are dedicated to uplink.

17. The method of claim 15, wherein the plurality of BWPs includes BWPs that are activated at a same time.

18. The method of claim 15, wherein the configuration is included in a radio resource control (RRC) message.

19. The method of claim 15, wherein, for one or more BWPs of the plurality of BWPs, the pattern of time-interval formats further includes one or more flexible time intervals, wherein the method further comprises:

receiving, from the base station, a slot format indicator (SFI) that indicates, for at least one BWP of the one or more BWPs, that a flexible time interval in a respective BWP-specific DL-UL pattern configured for the at least one BWP is to be used as a downlink time interval or an uplink time interval.

* * * * *